US009622084B2

(12) United States Patent
Ren et al.

(10) Patent No.: US 9,622,084 B2
(45) Date of Patent: Apr. 11, 2017

(54) METHOD AND SYSTEM OF RESOURCE RECONFIGURATION FOR COGNITIVE-RADIO SYSTEM

(75) Inventors: Longtao Ren, Shenzhen (CN); Xing Liu, Shenzhen (CN); Yan Li, Shenzhen (CN); Li Zhang, Shenzhen (CN); Ting Miao, Shenzhen (CN); Dong Zhou, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 284 days.

(21) Appl. No.: 14/129,343

(22) PCT Filed: Apr. 12, 2012

(86) PCT No.: PCT/CN2012/073931
§ 371 (c)(1),
(2), (4) Date: Dec. 26, 2013

(87) PCT Pub. No.: WO2013/000318
PCT Pub. Date: Jan. 3, 2013

(65) Prior Publication Data
US 2014/0120940 A1    May 1, 2014

(30) Foreign Application Priority Data

Jun. 30, 2011   (CN) .......................... 2011 1 0182342

(51) Int. Cl.
*H04W 72/00*  (2009.01)
*H04W 16/14*  (2009.01)
*H04W 28/16*  (2009.01)

(52) U.S. Cl.
CPC ........... *H04W 16/14* (2013.01); *H04W 28/16* (2013.01)

(58) Field of Classification Search
CPC ..... H04W 16/00; H04W 16/02; H04W 16/04; H04W 16/06; H04W 16/08; H04W 16/10;
(Continued)

(56) References Cited

U.S. PATENT DOCUMENTS 8,326,313 B2 * 12/2012 McHenry .............. H04W 16/14
370/277
2009/0190541 A1 * 7/2009 Abedi ................... H04W 16/10
370/329
(Continued)

FOREIGN PATENT DOCUMENTS

CN          1882158 A      12/2006
CN        101895991 A      11/2010
(Continued)

OTHER PUBLICATIONS

Cognitive radio systems in the land mobile service May 19, 2010.
(Continued)

*Primary Examiner* — Mong-Thuy Tran
(74) *Attorney, Agent, or Firm* — Oppedahl Patent Law Firm LLC

(57) ABSTRACT

The disclosure provides a method and system of resource reconfiguration for a cognitive-radio system. The method includes that: a reconfiguration module of a wireless communication system acquires a reconfiguration command according to a received spectrum refarming indication or by monitoring a network condition of the wireless communication system (101); and sends the reconfiguration command to a base station to implement resource reconfiguration by executing the reconfiguration command via the base station (102). With the disclosure, proper radio resource reconfiguration is performed by a reconfiguration module of each wireless communication system according to utilization of spectral resources in the system, so that the utilization of spectral resources in a primary system and between RATs
(Continued)

may be coordinated, thereby enhancing the resource utilization rate of each wireless communication system and the spectrum utilization rate of the primary system, such as a broadcast and television system, and leading to a more balanced network load.

15 Claims, 5 Drawing Sheets

(58) Field of Classification Search
CPC ..... H04W 16/12; H04W 16/14; H04W 16/18; H04W 16/22; H04W 8/00; H04L 12/24
USPC .... 455/454, 445, 446, 447, 450, 451, 452.2, 455/453, 62, 139, 313, 452.1
See application file for complete search history.

(56) References Cited

U.S. PATENT DOCUMENTS

| | | | | |
|---|---|---|---|---|
| 2010/0167654 A1* | 7/2010 | Son | ........................ | H04W 16/14 455/63.1 |
| 2010/0222065 A1* | 9/2010 | De Pasquale | ......... | H04W 16/14 455/450 |
| 2012/0039181 A1* | 2/2012 | Aziz | ................... | H04W 36/245 370/241 |
| 2012/0120887 A1* | 5/2012 | Deaton | ................. | H04W 16/14 370/329 |
| 2012/0236953 A1* | 9/2012 | Mueck | ................ | H04W 88/085 375/260 |
| 2013/0029706 A1* | 1/2013 | Sachs | .................... | H04W 16/14 455/501 |
| 2013/0190002 A1 | 7/2013 | De Pasquale et al. | | |

FOREIGN PATENT DOCUMENTS

| | | |
|---|---|---|
| CN | 102098684 A | 6/2011 |
| EP | 2203011 A1 | 6/2010 |
| GB | 2308789 A | 7/1997 |

OTHER PUBLICATIONS

Supplementary European Search Report in European application No. 12803632.4, mailed on Oct. 21, 2014.
Reconfigurable Radio Systems May 2010.
International Search Report in international application No. PCT/CN2012/073931, mailed on Jun. 21, 2012.
English Translation of the Written Opinion of the International Search Authority in international application No. PCT/CN2012/073931, mailed on Jun. 21, 2012.

* cited by examiner

METHOD AND SYSTEM OF RESOURCE RECONFIGURATION FOR COGNITIVE-RADIO SYSTEM

TECHNICAL FIELD

The disclosure relates to the field of wireless communication, in particular to a method and system of resource reconfiguration for a cognitive-radio system.

BACKGROUND

With the continuous improvement of radio technology, a variety of radio services spring in large numbers. Whereas on one hand, there are limited radio-service-bearing spectral resources, which are in short supply with respect to increasingly higher requirements on bandwidths; and on the other hand, the utilization rate of the spectral resources is low under a conventional mode of fixed spectrum allocation.

Meanwhile, with the diversification of system requirements, the current situation is that various Radio Access Technologies (RATs) coexists; and service distribution differs depending on different RATs, different operators and different geographic areas.

Given the status quo and trend of network operation at the time, an operator would prefer a unified management of different systems coexisting over a short term or a geographic location, so as to adapt to a feature of a network traffic and optimize resource utilization. Typically, for example, the operator wants to add a next-generation network over an area or a period of time with an existing network, such as to add a Long Term Evolution (LTE) network on the basis of a deployed 2G/3G network. Furthermore, the operator wants to manage hardware resources and wireless resources of both the next-generation and the existing systems dynamically according to a change in cell traffic in a specific area. Adopted here is a new technology of Cognitive Radio (CR).

Given a cell configuration in a specific area, traffics of different services in a specific system or different systems may vary in an area over a daily cycle. In addition, in some specific areas, some cells may be jammed (i.e., with a high probability of call blockage) and surrounded by a plurality of cells with low probabilities of call blockage. In addition, in the case that two or more RATs are deployed in the same area, traffics of different services of an RAT may distribute differently over time relative to another RAT. For example, if a Global System for Mobile communication (GSM) and an LTE system are deployed simultaneously in an area; in a period of time, the GSM may be under-loaded due to fewer GSM users and lighter service traffic, while a network side of the LTE system may be overloaded due to user assembling, heavy service traffic and strained resource supply in the LTE system. In such a scenario, it is a waste for the GSM to include idle resources while the LTE system is in short supply of resources. Therefore, a problem yet to be addressed is how to coordinate the utilization of spectral resources in a primary system and between RATS.

SUMMARY

To solve a problem of prior art, embodiments of the disclosure provide a method and system of resource reconfiguration for a cognitive-radio system, capable of coordinating the utilization of spectral resources in a primary system and between RATS.

To this end, a technical solution of the disclosure is implemented as follows.

A method of resource reconfiguration for a cognitive-radio system includes that:
  a reconfiguration module of a wireless communication system acquires a reconfiguration command according to a received spectrum refarming indication or by monitoring a network condition of the wireless communication system, and
  sends the reconfiguration command to a base station to implement resource reconfiguration by executing the reconfiguration command via the base station.

According to an embodiment, the wireless communication system may include a Global System for Mobile communication GSM, a Universal Mobile Telecommunication System UMTS, and a Long Term Evolution LTE system or a Long Term Evolution-Advanced LTE-A system.

The method may further include that:
  after acquiring available spectral resources according to overall network planning and a time schedule of an operator or by exchanging information with a database, a policy control center generates the spectrum refarming indication including an indication to reconfigure the spectral resources, addition of a Radio Access Technology RAT, or function enhancement of an existing RAT.

According to an embodiment, when a reconfiguration module of a wireless communication system acquires a reconfiguration command according to a received spectrum refarming indication or by monitoring a network condition of the wireless communication system,
  a reconfiguration module of each wireless communication system may acquire a reconfiguration command independently according to the spectrum refarming indication or by monitoring a network condition of the each wireless communication system.

According to an embodiment, when acquiring a reconfiguration command,
  a reconfiguration module located at a network node of a network management side, a core network side, or an access network side of a wireless communication system may acquire the spectrum refarming indication and information on spectrum utilization by exchanging information with a policy control center or by monitoring the network condition; and
  the reconfiguration module may acquire the reconfiguration command by analyzing the acquired information and running a reconfiguration algorithm.

According to an embodiment, the information on spectrum utilization may be information on utilization of local licensed spectra and borrowed spectra by each wireless communication system and information on spectrum utilization in a primary system, including one or more of the following: a carrier frequency, an operating bandwidth, a duration of an idle spectrum, and a requirement on a transmitter parameter; and
  the reconfiguration algorithm may include one or more of the following: a spectrum refarming, an upgrade of an existing RAT or layout of a new RAT, a radio resource optimization, and a loan of spectra by the primary system to a secondary system.

The method may further include that: before the reconfiguration module sends the reconfiguration command to the base station,
  the reconfiguration module consults a reconfiguration module of another wireless communication system to determine whether interference to an adjacent area or an adjacent band caused by new spectral resources contained in the reconfiguration command is less than a preconfigured threshold, and sends the reconfiguration command to the base station when the interference is less than the preconfigured threshold.

According to an embodiment, when the reconfiguration module sends the reconfiguration command to a base station to implement resource reconfiguration by executing the reconfiguration command via the base station, the reconfiguration module may send the reconfiguration command to a Radio Resource Manager RRM; and after receiving the reconfiguration command, the RRM may control the base station to execute reconfiguration.

The method may further include that: after implementing resource reconfiguration by executing the reconfiguration command via the base station, the base station replys a reconfiguration-complete message to the RRM after the base station completes the reconfiguration; and the RRM forwards the received reconfiguration-complete message to the reconfiguration module.

A system of resource reconfiguration for a cognitive-radio system includes a base station and a reconfiguration module, wherein the reconfiguration module is configured to acquire a reconfiguration command according to a received spectrum refarming indication or by monitoring a network condition of a local wireless communication system and send the reconfiguration command to a base station to implement resource reconfiguration by executing the reconfiguration command via the base station.

The system may further include a database and a policy control center, wherein the policy control center is configured to acquire available spectral resources according to overall network planning and a time schedule of an operator or by exchanging information with the database, and then generate the spectrum refarming indication including an indication to reconfigure the spectral resources, addition of a Radio Access Technology RAT, or function enhancement of an existing RAT.

According to an embodiment, a reconfiguration module of each wireless communication system may be configured to acquire a reconfiguration command independently according to the spectrum refarming indication or by monitoring a network condition of the each wireless communication system.

According to an embodiment, a reconfiguration module of a wireless communication system may be located at a network node of a network management side, a core network side, or an access network side depending on the wireless communication system, and be specifically configured to acquire the spectrum refarming indication and information on spectrum utilization by exchanging information with a policy control center or by monitoring the network condition, and acquire the reconfiguration command by running a reconfiguration algorithm according to the acquired information, wherein the information on spectrum utilization includes information on utilization of local licensed spectra and borrowed spectra by each wireless communication system and information on spectrum utilization in a primary system, including one or more of the following: a carrier frequency, an operating bandwidth, a duration of an idle spectrum, and a requirement on a transmitter parameter; and the reconfiguration algorithm includes one or more of the following: a spectrum refarming, an upgrade of an existing RAT or layout of a new RAT, a radio resource optimization, and a loan of spectra by the primary system to a secondary system.

According to an embodiment, the reconfiguration module may be configured to consult a reconfiguration module of another wireless communication system to determine whether interference to an adjacent area or an adjacent band caused by new spectral resources contained in the reconfiguration command is less than a preconfigured threshold, and send the reconfiguration command to the base station when the interference is less than the preconfigured threshold.

The system may further include a Radio Resource Manager RRM, wherein the reconfiguration module may be configured to send the reconfiguration command to the RRM; and the RRM may be configured to control the base station to execute reconfiguration after receiving the reconfiguration command.

According to an embodiment, the base station may be a Reconfigurable Base Station RBS configured to response the RRM with a reconfiguration-complete message after the base station completes the reconfiguration; and the RRM may be configured to forward the received reconfiguration-complete message to the reconfiguration module.

With the disclosure, proper wireless-resource reconfiguration is performed by a reconfiguration module of each wireless communication system according to utilization of spectral resources in the system, so that the utilization of spectral resources in a primary system and between RATs may be coordinated, thereby enhancing the resource utilization rate of each wireless communication system and the spectrum utilization rate of the primary system, such as a broadcast and television system, and leading to a more balanced network load.

DETAILED DESCRIPTION

According to embodiments of the disclosure, a reconfiguration module of a wireless communication system acquires a reconfiguration command according to a received spectrum refarming indication or by monitoring a network condition of the wireless communication system, and sends the reconfiguration command to a base station to implement resource reconfiguration by executing the reconfiguration command via the base station.

To clearly show a technical problem to be solved, a technical solution, and beneficial effects of the present disclosure, the present disclosure is further elaborated below with reference to the drawings and embodiments.

Figure 1:
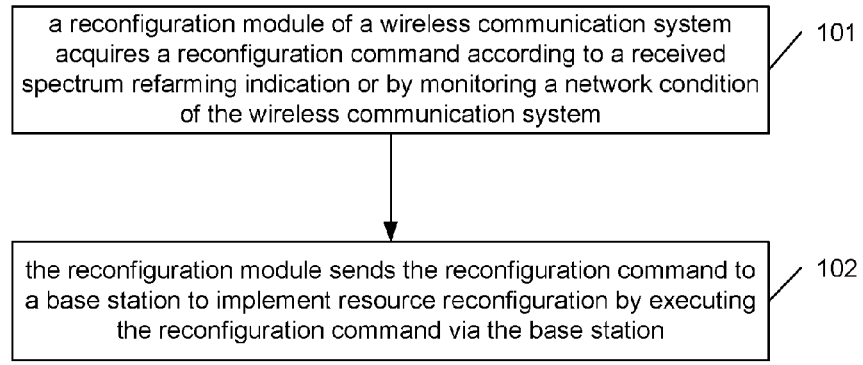
FIG. 1 is a flowchart of a method of resource reconfiguration for a cognitive-radio system of the disclosure.

FIG. 1 shows the flow of a method of resource reconfiguration for a cognitive-radio system of the disclosure. As shown, the method includes the following steps.

Step 101: a reconfiguration module of a wireless communication system acquires a reconfiguration command according to a received spectrum refarming indication or by monitoring a network condition of the wireless communication system.

Here, the wireless communication system at least includes a Global System for Mobile communication (GSM), a Universal Mobile Telecommunication System (UMTS), a Long Term Evolution (LTE) system/Long Term Evolution-Advanced (LTE-A) system, and the like.

The reconfiguration module may be located at different network nodes depending on the wireless communication system, and a reconfiguration module of each wireless communication system acquires a reconfiguration command independently according to the spectrum refarming indication or by monitoring a network condition of the each wireless communication system. Specifically, a reconfiguration module of each wireless communication system may be located at a network node of a network management side, a core network side, or an access network side depending on the each wireless communication system. For example, the reconfiguration module of the GSM may be located in a Base Station Controller (BSC); the reconfiguration module of the UMTS may be located in a Radio Network Controller (RNC); the reconfiguration module of the LTE may be located at a network management side, such as an Element Management System (EMS) or a Network Management System (NMS), or at a network optimization center; or a reconfiguration module may be located in a Reconfigurable Base Station (RBS); or a reconfiguration module may be located at a network node of a core network side, such as a Mobile Management Entity (MME).

A reconfiguration module of a wireless communication system acquires the spectrum refarming indication and information on spectrum utilization by exchanging information with a policy control center or by monitoring the network condition, and acquires the reconfiguration command by analyzing the acquired information and running a pre-stored reconfiguration algorithm.

Here, the information on spectrum utilization may be information on utilization of local licensed spectra and borrowed spectra by a wireless communication system and information on spectrum utilization in a primary system, specifically including one or more of the following: a carrier frequency, an operating bandwidth, a duration of an idle spectrum, and a requirement on a transmitter parameter; and the primary system may be a broadcast and television system or the like.

The pre-stored reconfiguration algorithm may include one or more of the following: a spectrum refarming, an upgrade of an existing RAT or layout of a new RAT, a radio resource optimization, and a loan of spectra by the primary system to a secondary system.

It should be understood that the method may further include that: before this step, the policy control center acquires available spectral resources according to overall network planning and a time schedule of an operator or by exchanging information with a database, and then generates the spectrum refarming indication including an indication to reconfigure the spectral resources, addition of an RAT, or function enhancement of an existing RAT. Specifically, for example, certain spectra of RAT1 may be reconfigured to RAT2, the LTE system may be deployed in the coverage area of the GSM, the UMTS may be upgraded to include High Speed Packet Access (HSPA) technology, and the like.

Step 102: the reconfiguration module sends the reconfiguration command to a base station to implement resource reconfiguration by executing the reconfiguration command via the base station.

Specifically, the reconfiguration module may send the reconfiguration command to a Radio Resource Manager (RRM); and after receiving the reconfiguration command, the RRM may control the base station to execute the reconfiguration, wherein the base station may be a Reconfigurable Base Station (RBS) capable of reconfiguring hardware resources and wireless resources and supporting multiple standard modes.

In addition, the method may further include that: after this step, the base station replies with a reconfiguration-complete message to the RRM after the base station completes the reconfiguration; and the RRM forwards the received reconfiguration-complete message to the reconfiguration module.

Figure 2:
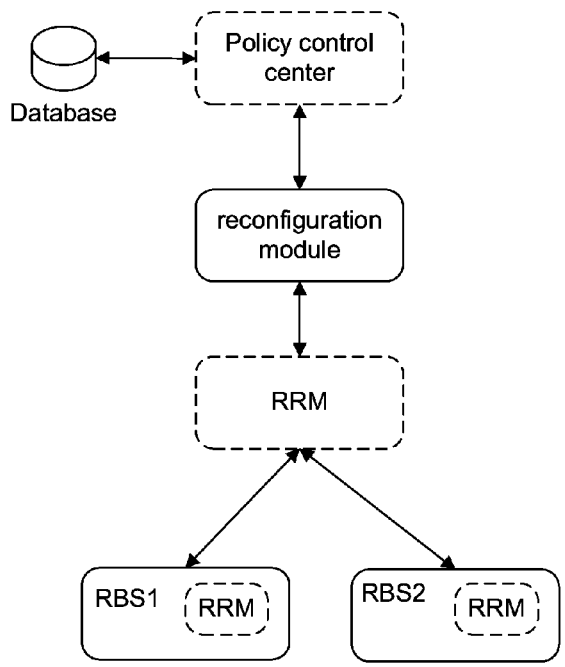
FIG. 2 is a diagram showing a structure of a system of resource reconfiguration for a cognitive-radio system of the disclosure.

FIG. 2 shows a structure of a system of resource reconfiguration for a cognitive-radio system of the disclosure. The system includes a base station and a reconfiguration module, wherein the base station is an RBS, shown as RBS1 and RBS2 in FIG. 2.

The reconfiguration module is configured to acquire a reconfiguration command according to a received spectrum refarming indication or by monitoring a network condition of a local wireless communication system and send the reconfiguration command to a base station to implement resource reconfiguration by executing the reconfiguration command via the base station.

The system may further include a database and a policy control center, wherein the database may be provided by the operator of a primary system or a third party, and contains information on a spectral status of the primary system in a local area or in a number of areas including the local area, information on utilization of idle spectra of the primary system by each reconfiguration module, and information on a load, communication quality, and utilization statistics within an area covered by each reconfiguration module; the database further includes information on spectra-related etiquette, such as a priority of a reconfiguration module, an interference-avoiding policy, a spectrum leasing rule, and the like. Wherein, the information on the spectral status of the primary system includes: an in-use spectra status including information such as a carrier frequency, a bandwidth, a possible duration, a coverage range, an isolation zone; an unused spectra status including information such as a carrier frequency, a bandwidth, a coverage range, a possible duration, a maximal permissible transmit power; and information on unavailable spectra, such as management-domain-restricted spectra or spectra reserved for an operator, including information such as a carrier frequency and a bandwidth. The information on utilization of idle spectra of the primary system by each reconfiguration module includes: idle spectra used by a local reconfiguration module and location of the local reconfiguration module. The database is responsible for overall allocation of idle spectral resources of the primary system to the reconfiguration module of each wireless communication system according to the stored information on spectra-related etiquette.

The policy control center is configured to acquire available spectral resources according to overall network planning and a time schedule of an operator or by exchanging information with the database, and then generate the spectrum refarming indication including an indication to reconfigure the spectral resources, addition of a Radio Access Technology RAT, or function enhancement of an existing RAT. Here, the policy control center may be located at a network management side such as an EMS or an NMS, or at a proxy node of a base station side, and is a functional module related to a policy of a side that deploys and adds a new RAT or upgrades, which requires borrowing of idle spectral resources of the primary system; and in an actual application, the policy control center may be operated by a network operator, and is further configured to acquire the information on spectrum utilization of the primary system from the database and the like.

Furthermore, the reconfiguration module may be located at a network node of a network management side, a core network side, or an access network side depending on a wireless communication system, and is specifically configured to acquire the spectrum refarming indication and information on spectrum utilization by exchanging information with a policy control center or by monitoring the network condition of the wireless communication system, and acquire the reconfiguration command by running a reconfiguration algorithm according to the acquired information. Specifically, the reconfiguration module is responsible for receiving and analyzing the spectrum refarming indication sent by the policy control center, receiving another consigned triggering process at a network side, and running self-optimization(s) and reconfiguration algorithm(s) activated by a new function and a new RAT; the reconfiguration module is further configured to monitor, after running the reconfiguration algorithm, cell activities of an RAT supported by the reconfiguration module, determine an RBS requiring reconfiguration by executing the reconfiguration algorithm, and send a proper reconfiguration instruction to control the reconfiguration. The reconfiguration module may further evaluate a demand for network reconfiguration and RBS resource allocation according to a result reported by a Mobile Device (MD).

Here, the reconfiguration command may include information such as functional enhancement of an existing RAT, a software version, spectra of a new RAT, a time point when a new function or a new RAT comes into effect, a range of enhancement of a new function.

Here, the information on spectrum utilization may be information on utilization of local licensed spectra and borrowed spectra by each wireless communication system and information on spectrum utilization in the primary system, specifically including one or more of the following: a carrier frequency, an operating bandwidth, a duration of an idle spectrum, and a requirement on a transmitter parameter.

The reconfiguration algorithm includes one or more of the following: a spectrum refarming, an upgrade of an existing RAT or layout of a new RAT, a radio resource optimization, and a loan of spectra by the primary system to a secondary system.

In an embodiment, the reconfiguration module may be further configured to consult a reconfiguration module of another wireless communication system to determine whether interference to an adjacent area or an adjacent band caused by new spectral resources contained in the reconfiguration command is less than a preconfigured threshold, and send the reconfiguration command to the base station when the interference is less than the preconfigured threshold.

Here, the system may further include an RRM, which may be located in a BSC/RNC or in an RBS in the GSM/UMTS, or may be located in an RBS in the LTE system.

The reconfiguration module is further configured to send the reconfiguration command to the RRM; and the RRM is configured to control the base station to execute the reconfiguration after receiving the reconfiguration command, wherein the RRM is further configured to receive a channel request from an RBS to perform RBS-channel-allocation evaluation, manage MD-wireless-channel request and allocation, instruct download and upgrade of a software version, monitor a cell load, indicate RBS reconfiguration, evaluate the impact of the reconfiguration such as an interference tolerance, and inform the reconfiguration module of a resource-allocation condition.

Here, the base station is RBS1 or RBS2, and is configured to reply with a reconfiguration-complete message to the RRM after the base station completes the reconfiguration. Specifically, the RBS can support handover between RATs, such as GSM→UMTS and UMTS→LTE. The base station is further configured to manage and configure a utilization rate of activated radio resources (RR) in each supported RAT, dynamically manage hardware resources of an existing system and a next-generation system, configure and allocate a utilization rate of activated RRs of Time Division Duplexing (TDD) or Frequency Division Duplexing (FDD) in one or more modes, perform dynamic capacity optimization, such as energy saving and load balancing, download and upgrade from a network a new function, such as UMTS→HSPA+, provide a user equipment (UE) with wireless-resource management and service, and the like.

The RRM is further configured to forward the received reconfiguration-complete message to the reconfiguration module.

Figure 3:
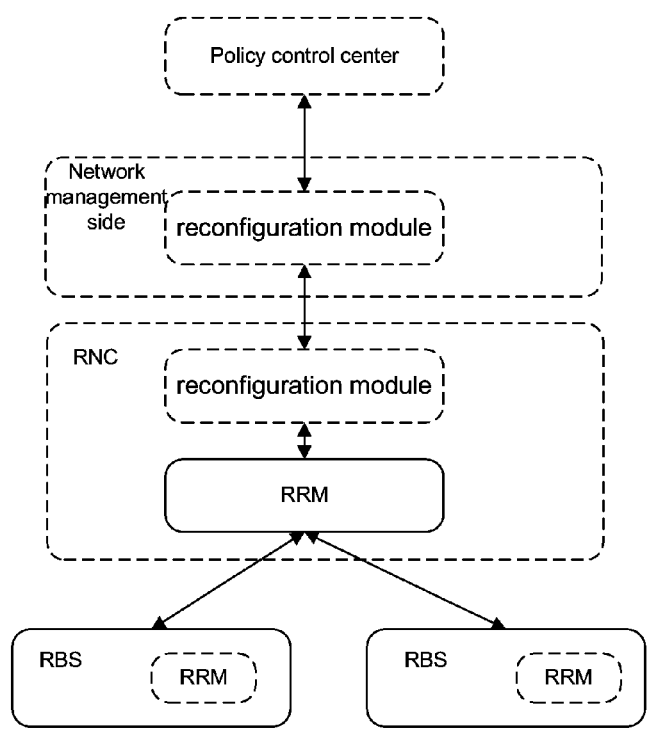
FIG. 3 is a diagram showing a structure of a system of resource reconfiguration for a cognitive-radio system in the first embodiment of the disclosure.

FIG. 3 shows a structure of a system of resource reconfiguration for a cognitive-radio system in the first embodiment of the disclosure. As shown, for UMTS, the reconfiguration module is located at an RNC side; and for an LTE system, the reconfiguration module is located at a network management side; and the process of reconfiguration from the UMTS to an LTE system is elaborated below with reference to FIG. 3.

Step 1: A policy control center reconfigures a band being used by an UMTS to an LTE system according to a time schedule of a network plan, and sends a spectrum refarming indication to a reconfiguration module at a network management side; and the network management side transparently transmits the spectrum refarming indication to an RNC in the UMTS.

The spectrum refarming indication includes but is not limited to: an indication to reconfigure the spectral resources, spectra being used by the UMTS, a valid period of time (such as a period of time during which the spectra are available), a range of area, and the like.

Step 2: The reconfiguration module at the RNC receives and analyzes the spectrum refarming indication, runs a reconfiguration algorithm and sends a reconfiguration command to RRM.

Here, the reconfiguration command includes: information on spectra to be reconfigured, a valid period of time, a range of area, a threshold of interference tolerance to an adjacent band, a handover command, and the like.

Step 3: The RRM receives the reconfiguration command from the reconfiguration module, evaluates impact of resource reconfiguration on a network side, and controls an RBS to execute the reconfiguration command.

It should be understood that the reconfiguration module may alternatively send the reconfiguration command directly to the RBS so that an RRM inside the RBS analyzes the reconfiguration command and controls the RBS to perform reconfiguration.

Step 4: After receiving the reconfiguration command, the RBS hands a UE using UMTS spectra to be reconfigured over onto another band, and performs reconfiguration within a valid period of time.

Step 5: The RBS returns a reconfiguration-complete message to the RNC, which then returns a UMTS-reconfiguration-complete message to the network management side.

The network management side reconfigures the spectra to the LTE system; and after reconfiguration to the LTE system, an upper-layer RNC-like node of the RBS serves for transparent transmission, while the RBS integrates the function of the RRM and may be taken as an eNB.

It should be understood that the process of reconfiguring a band of the GSM to the UMTS or the LTE system is similar to the aforementioned process; after reconfiguration to the UMTS, an upper-layer RNC serves as an RRM, while the RRM function in the RBS is weakened to a supporting role, with a logical function similar to a Node B.

Figure 4:
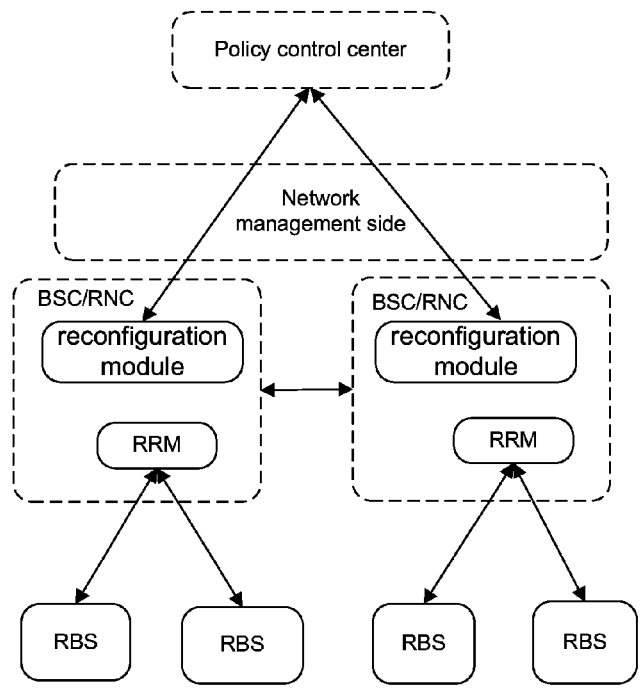
FIG. 4 is a diagram showing a structure of a system of resource reconfiguration for a cognitive-radio system in the second embodiment of the disclosure.

FIG. 4 shows a structure of a system of resource reconfiguration for a cognitive-radio system in the second embodiment of the disclosure. As shown, a reconfiguration module is located at a BSC side or an RNC side; and the process of reconfiguration of partial resources of the GSM to the UMTS is elaborated below with reference to FIG. 4.

Step 1: A reconfiguration module acquires a reconfiguration command by monitoring within a period of time, a network operation condition and utilization of activated wireless resources in a cell within a range managed by the reconfiguration module or according to a spectrum refarming indication sent by a policy control center, and sends the reconfiguration command to an RRM.

Specifically, when statistics of the reconfiguration module show a light GSM-traffic load and a heavy UMTS-traffic load, the reconfiguration module runs a reconfiguration algorithm to reconfigure some spectral resources in the GSM to usage in the UMTS so as to alleviate the UMTS-traffic load, and sends the reconfiguration command to the RRM.

Here, the reconfiguration module is located at an access network (RAN) side, which is, for the GSM, a case equivalent to that when the reconfiguration module is located at a BSC in term of a logical function.

The reconfiguration command includes: information on a carrier frequency added for the UMTS, a valid period of time, a range of area, a tolerance for interference to an adjacent band, a handover command, and the like.

Furthermore, before the reconfiguration command is given, the BSC may further consult an adjacent BSC/RNC to further determine the impact of interference to an adjacent area or an adjacent band caused by the spectra to be reconfigured.

Step 2: The RRM receives the reconfiguration command from the reconfiguration module, analyzes frequency information, and forwards the reconfiguration command to an RBS.

Step 3: The RBS performs resource reconfiguration according to the received reconfiguration command.

Specifically, the RBS hands a UE using a to-be-reconfigured GSM frequency to another frequency, reconfigures the to-be-reconfigured GSM frequency to the UMTS, and returns an acknowledgement message to the RRM.

Step 4: After receiving the acknowledgement message, the RRM sends the cell context information related to the reconfigured frequency to the UE, and returns a reconfiguration-complete message to the reconfiguration module.

Step 5: After frequency information of the UMTS is updated, the node where the reconfiguration module is located may be deemed as an RNC managing the RBS in terms of a logical function.

It should be understood that the reconfiguration module may be located in an RNC Element Manager when reconfiguration is performed from the GSM to the UMTS, and the reconfiguration module may be located in the network management side when reconfiguration is performed from the GSM to the LTE system.

Furthermore, when the reconfiguration module is located in the network management side, and when it is determined that resource reconfiguration is to be performed, the BSC sends a reconfiguration request indication to an upper-layer network management side; and the reconfiguration module at the network management side sends, according to the reconfiguration request indication, an RBS a reconfiguration command such as spectra to be reconfigured, an RAT after reconfiguration, a reconfiguration time, a range of area, an interference tolerance.

Figure 5:
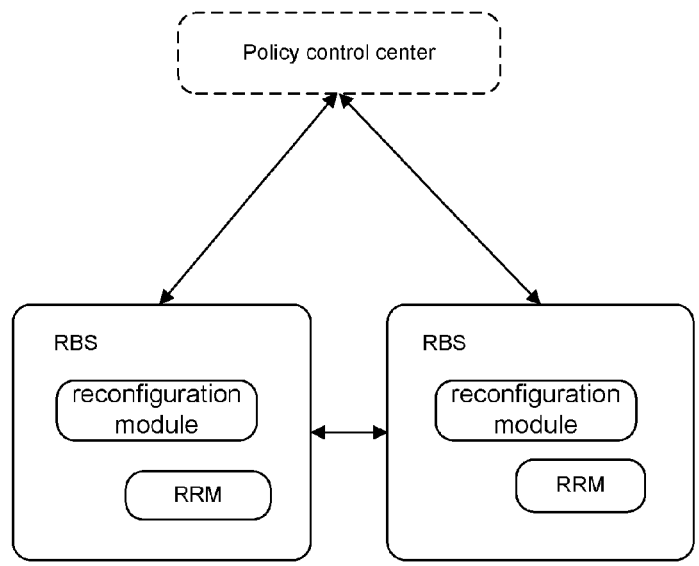
FIG. 5 is a diagram showing a structure of a system of resource reconfiguration for a cognitive-radio system in the third embodiment of the disclosure.

FIG. 5 shows a structure of a system of resource reconfiguration for a cognitive-radio system in the third embodiment of the disclosure. As shown, a reconfiguration module is located in an RBS; and the process of reconfiguration of spectra of the GSM to the LTE system is elaborated below with reference to FIG. 5.

Step 1: A reconfiguration module of an RBS acquires a reconfiguration command by monitoring a network load within a range of area and accounting the service traffic of each system or according to a received spectrum refarming indication sent by a policy control center, and sends the reconfiguration command to an RRM.

Specifically, when the statistics of the reconfiguration module show a light GSM-traffic load and a low GSM-resource utilization rate and show a heavy LTE-system-traffic load and a short LTE-system-resource supply, the reconfiguration module runs a reconfiguration algorithm to reconfigure spectral resources in the GSM to the use in the LTE system so as to alleviate the traffic load of the LTE system. Then, the reconfiguration module in the RBS sends the reconfiguration command to the RRM.

The reconfiguration command includes: a frequency to be reconfigured, a valid period of time, a range of area, a tolerance for interference to an adjacent band, and the like.

Furthermore, before the reconfiguration command is given, the RBS may further consult an adjacent RBS to further determine the impact of interference to an adjacent area or an adjacent band caused by the spectra to be reconfigured.

Step 2: The RRM reconfigures resources according to the reconfiguration command.

Specifically, the RRM hands a UE on a band in the GSM, which band is to be reconfigured, over to another band, and reconfigures the band in the GMS to the LTE system so as to alleviate the load of the LTE system.

It should be understood that when reconfiguration needs to be performed from the GSM to the UMTS or from the UMTS to the LTE system, the reconfiguration process of the system shown in FIG. 5 is the same as above, and thereby is not repeated.

Figure 6:
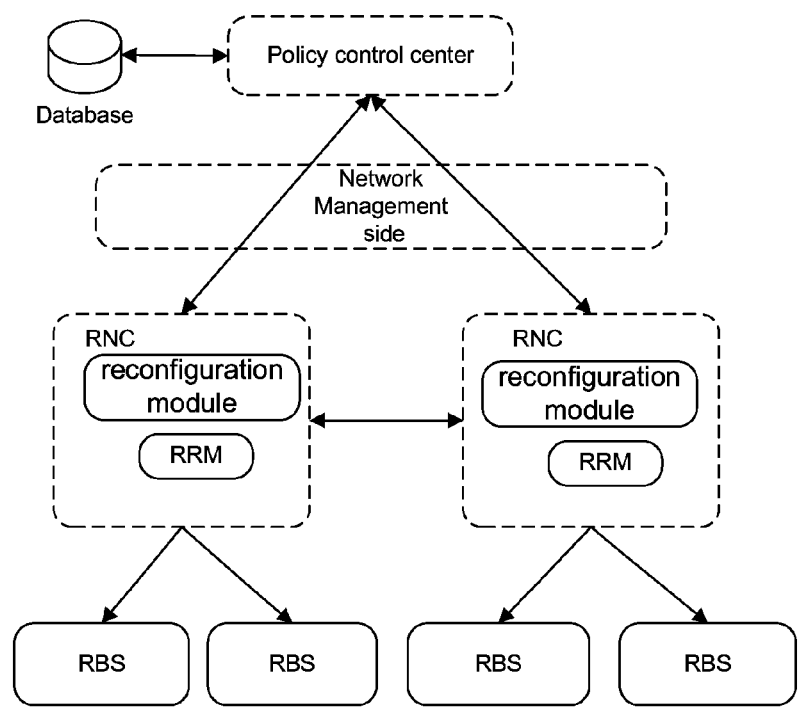
FIG. 6 is a diagram showing a structure of a system of resource reconfiguration for a cognitive-radio system in the fourth embodiment of the disclosure.

FIG. 6 shows a structure of a system of resource reconfiguration for a cognitive-radio system in the fourth embodiment of the disclosure. As shown, a reconfiguration module is located at an RNC side; and the process of requesting by the UMTS to borrow TV White Spaces (TVWS) of a broadcast and television system is elaborated below with reference to FIG. 6.

Step 1: A reconfiguration module at an RNC side monitors a network operation condition, and reports the network operation condition and a request indication to an upper-layer policy control center when a condition such as a heavy traffic load is monitored.

The request indication includes information such as a current load of a network side (such as occupancy condition of radio resources) and spectral resource used.

Step 2: After receiving the request indication from the reconfiguration module, the policy control center interacts with a database to request for idle spectral resources; the database analyzes the collected information on utilization of TVWS spectra and returns available spectral resources to the policy control center; and the policy control center sends the RNC side a spectrum refarming indication which may include information such as an indication of available spectra.

Step 3: After the RNC side receives the spectrum refarming indication, the reconfiguration module acquires a reconfiguration command by analyzing the available spectra and running a reconfiguration algorithm, and sends the reconfiguration command to an RBS through an RRM.

The reconfiguration command includes information such as available spectra, an effective period of time, a range of area, an interference tolerance.

Specifically, after receiving information on available spectral resources, the RNC may exchange with an adjacent RNC through an Iur, information such as the interference to an adjacent area caused by new spectral resources, and then send the reconfiguration command to the RBS through the RRM.

Step 4: After receiving the reconfiguration command, the RBS reconfigures resources within the effective period of time; and the UMTS uses the idle spectral resources in a TV band and hands some UEs over onto new spectra to alleviate the current load.

In the embodiment, the reconfiguration module may be located in a background Element Manager of the RNC to manage the spectral resources of the RNC.

Figure 7:
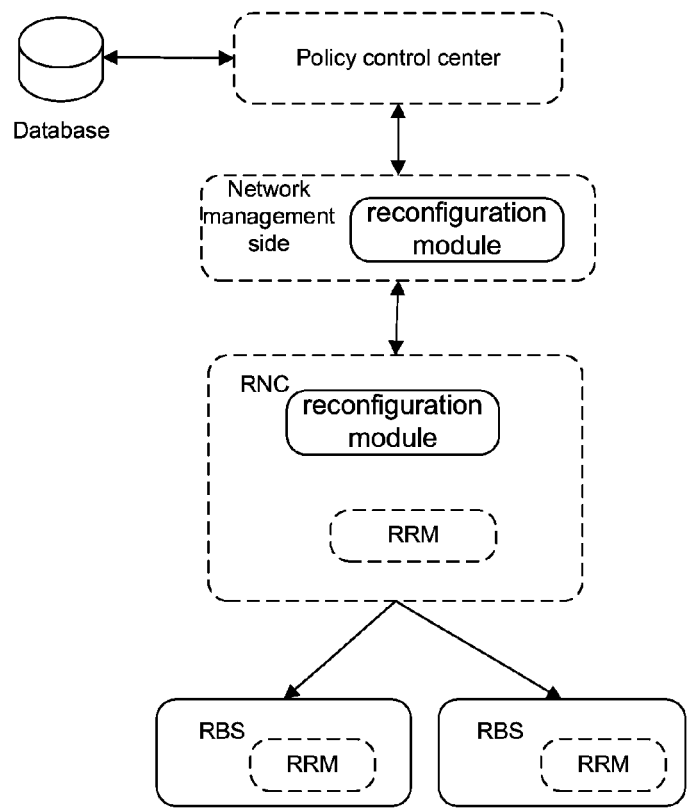
FIG. 7 is a diagram showing a structure of a system of resource reconfiguration for a cognitive-radio system in the fifth embodiment of the disclosure.

FIG. 7 shows a structure of a system of resource reconfiguration for a cognitive-radio system in the fifth embodiment of the disclosure. As shown, for the LTE system, the reconfiguration module is located at a network management side, an RNC serves for transparent transmission, and the RBS logically functions as an eNB and has the function of an RRM; for the UMTS, the reconfiguration module is located at the RNC, and the function of the RRM in the RBS is weakened and is mainly executed at the RNC side. The process of requesting by the LTE system to borrow the TVWS is elaborated below with reference to FIG. 7.

Step 1: A base station side in the LTE system detects a network operation condition, collects information on a channel resource request from a UE, and reports an aggravated traffic load to a reconfiguration module.

Step 2: The reconfiguration module of a network management side analyzes the service and resource utilization at a network side, and interact with a database through a policy control center, for available idle spectral resources in a TV band when the LTE system is in short supply of resources.

Here, the function of the database is as described in the fourth embodiment.

Step 3: The reconfiguration module at the network management side receives and then parses a spectrum refarming indication; and if interference to spectra being used in the UMTS exceeds a preconfigured threshold, such information may be fed back to the policy control center, otherwise a reconfiguration command is transparently transmitted to an RBS by an RNC.

Step 4: After receiving the reconfiguration command, the RBS reconfigures resources to hand some UEs over onto new spectral resources to alleviate the load.

Furthermore, if the UMTS requests for TVWS, after receiving a spectrum refarming indication, the reconfiguration module of the RNC may interact with an upper-layer network management side managing the reconfiguration module of the LTE system to find out whether there is any interference to the LTE system; if interference to spectra being used in the LTE system exceeds a preconfigured threshold, such information may be fed back to the policy control center, otherwise a reconfiguration command is sent to the RBS.

What described are merely preferred embodiments of the disclosure and are not intended to limit the scope of the disclosure.

The invention claimed is:
1. A method of resource reconfiguration for a cognitive-radio system, comprising:
acquiring, by a reconfiguration module of a wireless communication system, a reconfiguration command according to a received spectrum refarming indication or by monitoring a network condition of the wireless communication system; and
sending, by the reconfiguration module, the reconfiguration command to a base station, and implementing resource reconfiguration by executing the reconfiguration command via the base station,
wherein the acquiring, by the reconfiguration module of the wireless communication system, the reconfiguration command according to the received spectrum refarming indication or by monitoring the network condition of the wireless communication system comprises:
acquiring, by the reconfiguration module of the wireless communication system, the spectrum refarming indication and information on spectrum utilization by exchanging information with a policy control center or by monitoring the network condition; and
acquiring, by the reconfiguration module, the reconfiguration command by analyzing the acquired information and running a pre-stored reconfiguration algorithm,
wherein the information on spectrum utilization comprises information on utilization of local licensed spectra and borrowed spectra by the wireless communication system and information on spectrum utilization in a primary system, wherein the information on spectrum utilization further comprises a duration of an idle spectrum; and
the pre-stored reconfiguration algorithm comprises a loan of spectra by the primary system to a secondary system.

2. The method according to claim 1, wherein the wireless communication system comprises a Global System for Mobile communication GSM, a Universal Mobile Telecommunication System UMTS, and a Long Term Evolution LTE system or a Long Term Evolution-Advanced LTE-A system.

3. The method according to claim 1, further comprising:
after acquiring, by the policy control center, available spectral resources according to overall network planning and a time schedule of an operator or by exchanging information with a database, generating, by the policy control center, the spectrum refarming indication comprising an indication to reconfigure the spectral resources, addition of a Radio Access Technology RAT, or function enhancement of an existing RAT.

4. The method according to claim 1, wherein the reconfiguration module is located at a network node of a network management side, a core network side, or an access network side of the wireless communication system.

5. The method according to claim 1, further comprising: before the sending, by the reconfiguration module, the reconfiguration command to the base station,
consulting, by the reconfiguration module, a reconfiguration module of another wireless communication system to determine whether interference to an adjacent area or an adjacent band caused by new spectral resources contained in the reconfiguration command is less than a preconfigured threshold, and sending the reconfiguration command to the base station when the interference is less than the preconfigured threshold.

6. The method according to claim 1, wherein the sending, by the reconfiguration module, the reconfiguration command to the base station, and implementing resource reconfiguration by executing the reconfiguration command via the base station comprises:
sending, by the reconfiguration module, the reconfiguration command to a Radio Resource Manager RRM; and
after receiving the reconfiguration command, controlling, by the RRM, the base station to execute reconfiguration.

7. The method according to claim 6, further comprising: after the implementing resource reconfiguration by executing the reconfiguration command via the base station,
returning, by the base station, a reconfiguration-complete message to the RRM after the base station completes the reconfiguration; and
forwarding, by the RRM, the received reconfiguration-complete message to the reconfiguration module.

8. The method according to claim 1, wherein the acquiring, by the reconfiguration module of the wireless communication system, the reconfiguration command according to the received spectrum refarming indication or by monitoring the network condition of the wireless communication system comprises:
acquiring, by a reconfiguration module of each wireless communication system, a reconfiguration command independently according to the spectrum refarming indication or by monitoring a network condition of the each wireless communication system.

9. A system of resource reconfiguration for a cognitive-radio system, comprising a policy control center, a base station and a reconfiguration module, wherein
the reconfiguration module is configured to acquire a reconfiguration command according to a received spectrum refarming indication or by monitoring a network condition of a local wireless communication system and send the reconfiguration command to the base station to implement resource reconfiguration by executing the reconfiguration command via the base station,
wherein the reconfiguration module of the wireless communication system is configured for acquiring the spectrum refarming indication and information on spectrum utilization by exchanging information with the policy control center or by monitoring the network condition; and acquiring the reconfiguration command by analyzing the acquired information and running a pre-stored reconfiguration algorithm,
wherein the information on spectrum utilization comprises information on utilization of local licensed spectra and borrowed spectra by the wireless communication system and information on spectrum utilization in a primary system, wherein the information on spectrum utilization further comprises a duration of an idle spectrum; and
the pre-stored reconfiguration algorithm comprises a loan of spectra by the primary system to a secondary system.

10. The system according to claim 9, further comprising a database, wherein
the policy control center is configured to acquire available spectral resources according to overall network planning and a time schedule of an operator or by exchanging information with the database, and then generate the spectrum refarming indication comprising an indication to reconfigure the spectral resources, addition of a Radio Access Technology RAT, or function enhancement of an existing RAT.

11. The system according to claim 9, wherein the reconfiguration module of the wireless communication system is located at a network node of a network management side, a core network side, or an access network side depending on the wireless communication system.

12. The system according to claim 9, wherein the reconfiguration module is configured to consult a reconfiguration module of another wireless communication system to determine whether interference to an adjacent area or an adjacent band caused by new spectral resources contained in the reconfiguration command is less than a preconfigured threshold, and send the reconfiguration command to the base station when the interference is less than the preconfigured threshold.

13. The system according to claim 9, further comprising a Radio Resource Manager RRM, wherein
the reconfiguration module is configured to send the reconfiguration command to the RRM; and
the RRM is configured to control the base station to execute reconfiguration after receiving the reconfiguration command.

14. The system according to claim 13, wherein the base station is a Reconfigurable Base Station RBS configured to return a reconfiguration-complete message to the RRM after the base station completes the reconfiguration; and
the RRM is configured to forward the received reconfiguration-complete message to the reconfiguration module.

15. The system according to claim 9, wherein a reconfiguration module of each wireless communication system is configured to acquire a reconfiguration command independently according to the spectrum refarming indication or by monitoring a network condition of the each wireless communication system.

* * * * *